United States Patent [19]

Peltzer

[11] Patent Number: 5,641,410

[45] Date of Patent: Jun. 24, 1997

[54] SYSTEM FOR TREATING RECLAIMED WATER TO PROVIDE TREATED WATER AND CORRESPONDING METHOD

[76] Inventor: Charles T. Peltzer, 3950 Miraloma, Anaheim, Calif. 92806

[21] Appl. No.: 582,213

[22] Filed: Jan. 2, 1996

[51] Int. Cl.$^6$ .................................................. B01D 17/12
[52] U.S. Cl. .............................. 210/739; 137/5; 137/93; 210/87; 210/96.1; 210/101; 210/746; 366/152.4
[58] Field of Search .................. 210/85, 87, 93, 210/96.1, 97, 101, 109, 134, 136, 137, 143, 198.1, 739, 742, 743, 746, 747, 921, 96.2, 205; 137/3, 5, 88, 93, 111; 405/36, 37; 366/132, 152.1, 152.2, 152.4; 422/62, 111; 364/497, 500, 502, 510

[56] References Cited

U.S. PATENT DOCUMENTS

| | | | |
|---|---|---|---|
| 3,899,294 | 8/1975 | Magiros | 210/743 |
| 4,648,043 | 3/1987 | O'Leary | 137/93 |
| 4,784,495 | 11/1988 | Jonsson et al. | 366/152.4 |
| 4,931,187 | 6/1990 | Derham et al. | 210/742 |
| 4,940,551 | 7/1990 | Riggs et al. | 210/743 |
| 5,332,494 | 7/1994 | Eden et al. | 210/96.1 |
| 5,516,423 | 5/1996 | Conoby et al. | 210/96.1 |

Primary Examiner—Joseph W. Drodge
Attorney, Agent, or Firm—Gary Appel

[57] ABSTRACT

A water treatment system provides a flow of treated water having a pre-established quality, for example, a maximum TDS and permitted pH range, from a flow of reclaimed water having a quality poorer than the pre-established quality of the treated water and a flow of treatment water. The system includes a mixing reservoir; first and second fluid conduits connected to the mixing reservoir for flowing the reclaimed water and the treatment water into the reservoir; and a third fluid conduit connected to the mixing reservoir for discharging a flow of treated water from the mixing reservoir; and sensors connected for sensing the flow rates and qualities of the reclaimed water and treatment water flowed into the mixing reservoir and of the treated water discharged from the mixing reservoir. Electrical signals associated with the sensors indicate the sensed water flow rates and qualities, and controls responsive to the electrical signals regulate the flows of reclaimed water and treatment water into the mixing reservoir through the controlled flow valves in the first and second conduits so as to cause the quality of the treated water discharged from the mixing reservoir through said third fluid conduit to be at least about as good as the pre-established treated water quality. A corresponding method of providing treated water of defined quality is provided.

15 Claims, 1 Drawing Sheet

SYSTEM FOR TREATING RECLAIMED WATER TO PROVIDE TREATED WATER AND CORRESPONDING METHOD

BACKGROUND OF THE INVENTION

1. Field of the Invention

The present invention relates generally to the field of water treatment systems, and more particularly systems for converting reclaimed water into non-potable, treated water useful for watering parkways, highway borders, crop irrigation, and the like, which do not need nor require the use of potable water.

2. Background Discussion

Water conservation, as well as anti-pollution laws and regulations are in effect in many parts of the United States and in many countries outside the United States. Often these requirements are addressed together with the use of treated, but non-potable, reclaimed, typically referred to as "treated water," for the watering of large areas where such use is practical. Typical of such uses are the watering of golf courses, parks and highway borders and median strips, and the irrigation of some types of crops.

As above mentioned, the reclaimed water, which may comprise sanitized water from sewage plants and industrial processes, or certain types of run-offs, requires a certain amount of treatment or additional treatment in order to bring the reclaimed water up to acceptable treated water standards. This requirement typically involves two problems: the pretreated effluent may vary from time-to-time, and/or in location-to-location, in such parameters as pH, the amount of total dissolved solids (TDS), and the flow rate, and the treated water requirements as to the foregoing may be different in different locations and may even vary in a given locality according to the intended use.

Because of the variables involved with both the innate quality of the reclaimed water and the requirements for the treated water, the treatment of a flow of reclaimed water with just the minimal amount of clean treatment water to provide a treated water meeting the pre-established quality levels has, so far as is known to the present inventor, been difficult, if not impossible to provide in an economical manner.

It is, therefore, a principal objective of the present invention to provide an effective and efficient system for converting reclaimed water into treated water having a pre-established quality greater than that of the reclaimed water by mixing a minimum amount of clean treatment water with the reclaimed water.

SUMMARY OF THE INVENTION

In accordance with the present invention, there is provided an automated system for treating reclaimed water to convert it to treated water useful for applications requiring reasonably clean, but not necessarily potable, water. Some examples of such treated water uses are the watering of street median strips, freeway rights of way, golf courses, park green regions, and agriculture.

The reclaimed water treatment system, according to the present invention, provides a flow of treated water having a pre-established quality from a flow of reclaimed water having a quality poorer than the pre-established quality of the treated water.

The system comprises a mixing reservoir, and first and second fluid conduits connected to the mixing reservoir for respectively flowing the reclaimed water and treatment water into the mixing reservoir. Included in the system is a third fluid conduit connected to the mixing reservoir for discharging a flow of treated water from the mixing reservoir and sensing means connected for sensing (1) the flow rate and quality of the reclaimed water entering the mixing reservoir through the first fluid conduit, (2) the flow rate and quality of the treatment water entering the mixing reservoir through the second fluid conduit, and (3) the quality of the treated water being discharged from the mixing reservoir through the third fluid conduit.

The water treatment system further comprises electronic signal generating means connected to the sensing means for providing electrical signals indicative of the sensed water flow rates and qualities and control means responsive to such electrical signals for regulating the flows of reclaimed water and treatment water into the mixing reservoir through the first and second fluid conduits, so as to cause the quality of the treated water discharged from the mixing reservoir through the third fluid conduit to be at least about as good as the pre-established treated water quality.

In accordance with a preferred embodiment of the invention, the control means include first and second electrically-controlled flow valves installed, respectively, in the first and second fluid conduits upstream of the mixing reservoir, the control means automatically controlling the opening and closing of such first and second valves to thereby regulate the flows of reclaimed water and treatment water into the mixing reservoir through the first and second fluid conduits so as to cause the treated water being discharged from the mixing reservoir through the third fluid conduit to have at least the pre-established quality.

In some instances, the pre-established treated water quality includes a pre-established maximum TDS level, the sensing means then including separate water conductivity measuring means installed in the first and second fluid conduits upstream of the mixing reservoir and in the third fluid conduit downstream of said mixing reservoir. In such case, the electrical signal generating means are responsive to the conductivity measuring means for providing electrical signals to the control means indicative of the TDS levels in the reclaimed water, in the treatment water and in the treated water. The control means are responsive to these electrical signals for controlling operation of the two valves so as to regulate the flows of reclaimed water and treatment water into the mixing reservoir in a manner causing the TDS level of the treated water discharged from the mixing reservoir through the third fluid conduit to be no greater than the pre-established TDS level.

In addition, or in the alternative, the pre-established treated water quality includes a pre-established pH range. In such case, the sensing means include first, second and third pH measuring means installed respectively in the first and second fluid conduits upstream of the mixing reservoir and in the third fluid conduit downstream of said mixing reservoir, the electrical signal generating means being responsive to the pH measuring means for providing electrical signals to the control means indicative of the pHs of the reclaimed water, of the treatment water and of the treated water.

In the event that the pH of the treatment water is insufficient or incorrect, such that when the treatment water is combined with the reclaimed water in the mixing reservoir the pre-established pH range for the treated water cannot be reached, the system is provided with a source of acid and a source of base and includes acid and base conduits connected for flowing acid from the acid source and base from the base source into the flow of treatment water. In such case, the control means include electrically controlled acid and/or base valves installed respectively in the acid conduit and the base conduit for controlling the flow of acid and base into the flow treatment water and thereby establishing the pH of the treatment water as is needed to provide the treated water pH in the pre-established range.

Preferably, the sensing means include first and second fluid flow meters installed respectively in the first and second fluid flow conduits upstream of the mixing reservoir for measuring the flow rates of the reclaimed and treatment water entering the mixing reservoir, the signal generating means providing electrical signals to the control means indicative of the flow rates of the reclaimed water and treatment water.

For sanitary reasons, especially if the treatment water is obtained from potable city water, the water treatment system as claimed in claim 1, including one-way flow valves installed in the first and second fluid flow conduits so that the reclaimed water is prevented from flowing into the treatment water second conduit and so that the treatment water is prevented from flowing into the reclaimed water first conduit. Also preferably, the water treatment system includes means installed in the third conduit for enhancing the mixing of the reclaimed and treatment waters in the mixing reservoir.

The invention further includes a corresponding method for providing a flow of treated water having a preestablished quality from a flow of reclaimed water having a quality poorer than the preestablished quality of the treated water, the method comprising the steps of flowing the reclaimed water and the treatment water into a mixing reservoir through respective first and second fluid flow conduits and discharging a flow of treated water from the mixing reservoir through a third fluid flow conduit.

Included in the method are the further steps of sensing (1) the quality of the reclaimed water entering the mixing reservoir through the first fluid conduit, (2) the quality of the treatment water entering the mixing reservoir through the second fluid conduit, and (3) the quality of the treated, treated water being discharged from the mixing reservoir through the third fluid conduit, and providing electrical signals indicative of the sensed reclaimed, treatment and treated water qualities.

Still further comprising the method is the step of regulating, in response to the electrical signals, the flows of reclaimed water and treatment water into the mixing reservoir through the first and second fluid conduits so as to cause the quality of the treated water discharged from the mixing reservoir through the third fluid conduit to be at least about as good as the pre-established treated water quality.

The method includes installing respective first and second electrically-controlled flow valves in the first and second fluid conduits upstream of the mixing reservoir, and automatically controlling the opening and closing of such first and second valves to regulate the flows of reclaimed water and treatment water into the mixing reservoir through the first and second fluid conduits in a manner causing the treated water being discharged from the mixing reservoir through the third fluid conduit to have at least the pre-established quality.

When the pre-established treated water quality includes a pre-established maximum TDS level and the TDS level in the flow of reclaimed water into the mixing reservoir is greater than the pre-established TDS level and the TDS level in the flow of treatment water into the mixing reservoir is less than the pre-established maximum TDS level, the method including the steps of measuring (1) the conductivity of the reclaimed water flowing into the mixing reservoir through the first fluid conduit, (2) the conductivity of the treatment water flowing into the mixing reservoir through the second fluid conduit, and (3) the conductivity of the treated water flowing from the mixing reservoir through the third fluid conduit; providing electrical signals indicative of the TDS levels in the reclaimed water, in the treatment water and in the treated water; installing respective first and second electrically controlled flow control valves in the first and second fluid conduits upstream of the mixing reservoir; and controlling operation of these valves so as to regulate the flows of reclaimed water and treatment water into the mixing reservoir in a manner causing the TDS of the treated water discharged from the mixing reservoir through the third fluid conduit to be no greater than the pre-established maximum TDS level.

If the pre-established treated water quality includes a pre-established pH range and the pH of the reclaimed water flowing into the mixing reservoir is outside this pre-established pH range, the method includes the steps of measuring (1) the pH level of the reclaimed water flowing into the mixing reservoir through the first conduit, (2) the pH level of the treatment water flowing into the mixing reservoir through the second conduit, and (3) the pH level of the treated water flowing out of the mixing reservoir through the third conduit, and providing electrical signals indicative of the pHs of the reclaimed water, of the treatment water, and of the treated water. For situations in which the natural pH of the treatment water is insufficient to provide a treated water with a pH in the pre-established pH range, the method includes the steps of flowing an acid from an acid source or flowing a base from a base source into the flow of treatment water in a manner controlling the pH of the treatment water such that the produced treated water has a pH in the pre-established range.

Preferably, the method of the invention further includes the step of providing a back pressure in the flow of treated water from the mixing reservoir so as to enhance the mixing of the reclaimed water and the treatment water in the mixing reservoir.

An effective and relatively economical apparatus and method for providing a flow of treated water from a flow of reclaimed water having a lesser quality is therefore provided.

BRIEF DESCRIPTION OF THE DRAWINGS

The present invention can be more readily understood by a consideration of the following detailed description when taken in conjunction with the accompanying drawing of an automated system for treating reclaimed water and converting it into treated water, there being shown a pipe conduit arrangement in which reclaimed water is mixed with clean water to form non-potable, treated water and showing various water condition sensors and valves which are connected to a computerized control which mixes the reclaimed water and clean water in a manner providing a treated water output having defined characteristics.

DETAILED DESCRIPTION OF THE INVENTION

Figure 1:
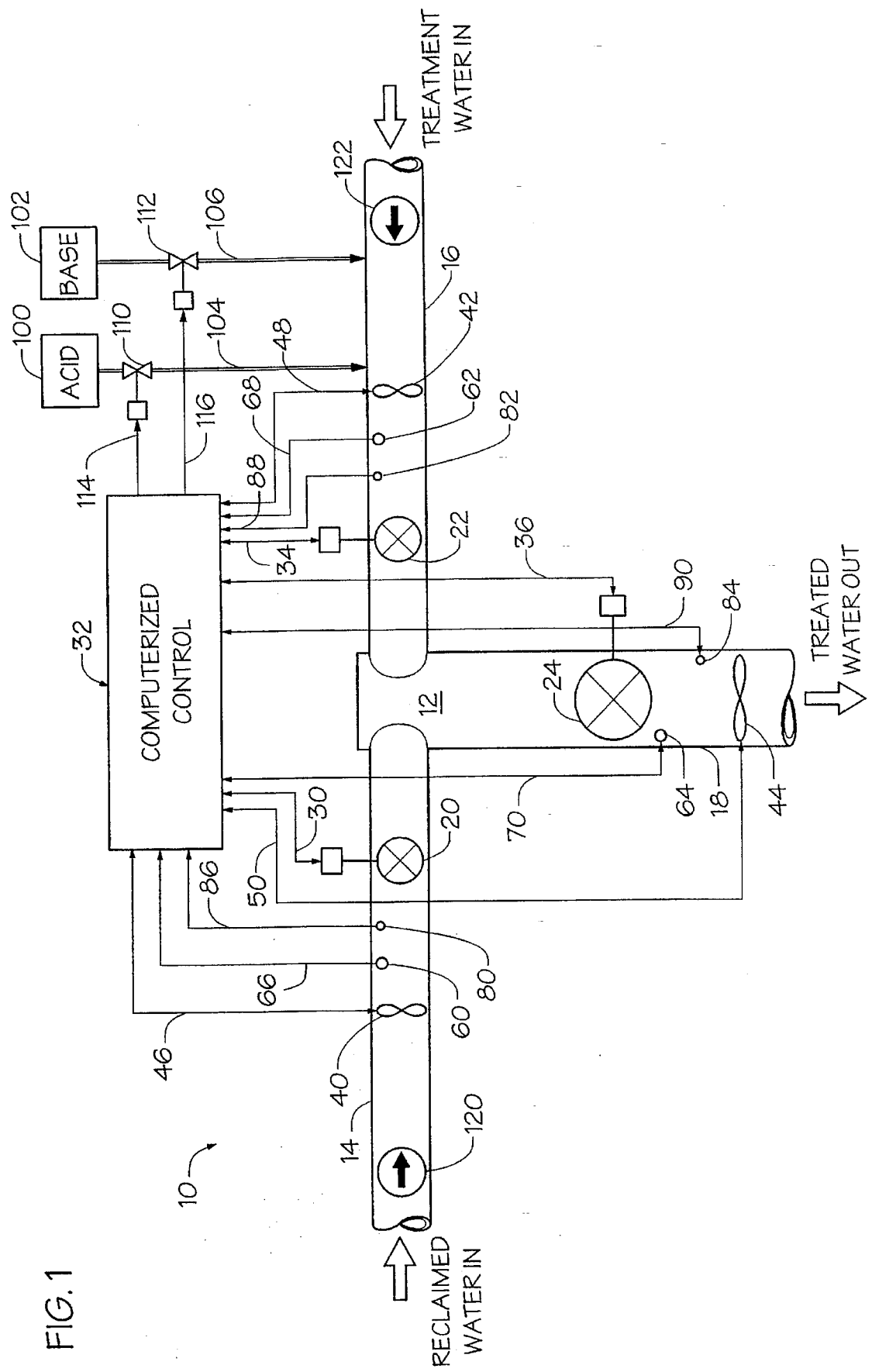

There is shown in the drawing an automated reclaimed water treatment system 10 for providing a flow of treated water having a pre-established quality requirement from reclaimed water having a poorer quality than that required for the treated water.

The quality requirements for the treated water may include a maximum allowable amount of TDS, salinity, and a particular, acceptable pH range. By way of example, with no limitations thereby implied or intended, the treated water may have a TDS requirement of about 750±50 parts per million (PPM) and a required pH range between 7 and 7.5. In contrast, the reclaimed water may have a TDS level anywhere between about 300 and 5000 PPM and a pH between about 6 and about 9.

The treatment water, which as explained below is combined with the reclaimed water as required to provide the treated water, may be potable-quality city water or water from a well or other clean water source. Typically, the treatment water will have no more than about 20 TDS and will typically have a pH of about 7.

Shown in the drawing comprising system 10 are a water mixing reservoir or mixing region 12 and respective first, second and third fluid conduits 14, 16 and 18 which are connected in fluid flow relationship to the mixing reservoir. First conduit 14 is connected for delivering a flow of the reclaimed water to mixing reservoir 12, second conduit 16 is connected for delivering a flow of the treatment water to the mixing reservoir, and third conduit 18 is connected for discharging a flow of the treated water from the mixing reservoir.

First inlet conduit 14 has a cross sectional area equal to $A_1$ and second inlet conduit 16 has a cross sectional area equal to $A_2$, and third outlet conduit 18 has a cross sectional area equal to $A_3$ which is preferably equal to the combined cross sectional areas $A_1$ and $A_2$.

Respective first and second control valves 20 and 22 are installed in respective fluid conduits 14 and 16 upstream of mixing reservoir 12 to control the flow of reclaimed water and the flow of treatment water into the mixing reservoir. As shown in the drawing, valves 20 and 22 are installed in conduits 14 and 16 relatively adjacent to mixing reservoir 12.

A third flow control valve 24 is installed in treated water conduit 18 just downstream of mixing reservoir 12. Third valve 24 serves to enhance the mixing of the flows of reclaimed water and treatment water in mixing reservoir 12.

All of first, second and third valves 20, 22 and 24 are of the electronically-controlled type, as is well know in the fluid flow control art. That is, each of such valves 20, 22 and 24 are electrically operated for any desired amount of opening and closing. First valve 20 is shown operatively connected, by an electrical conduit 30, to a computerized control 32. Similarly, second and third valves 22 and 24 are operatively connected to control 32 by respective electrical conduits 34 and 36.

First and second fluid flowmeters 40 and 42 are installed in respective first and second fluid conduits 14 and 16, preferably upstream of respective first and second valves 20 and 22, for respectively measuring the flow rates of the reclaimed water and the treatment water entering mixing reservoir 12. A third fluid flowmeter 44 is installed in third fluid conduit downstream of third valve 24 for measuring the flow rate of the treated water discharged from mixing reservoir 12. First, second and third flowmeters 40, 42 and 44 are operatively connected to control 32 by respective electrical conduits 46, 48 and 50.

A first fluid conductivity sensor 60 is installed in first conduit 14 intermediate first flowmeter 40 and first valve 20 for measuring the TDS in the reclaimed water. A second fluid conductivity sensor 62 is installed in second conduit 16 intermediate second flowmeter 42 and second valve 22 for measuring the TDS in the treatment water flowing into mixing reservoir 12. A third fluid conductivity sensor 64 is installed in third conduit 18 intermediate third flowmeter 44 and third valve 24 to measure the TDS in the treated water discharged from mixing reservoir 12. First, second and third fluid conductivity sensors 60, 62 and 64 are operatively connected to control 32 by respective electrical conduits 66, 68 and 70.

A first pH meter or sensor 80 is installed in first conduit 14 intermediate first flowmeter 40 and first valve 20 for measuring the pH of the reclaimed water. A second pH meter or sensor 82 is installed in second conduit 16 intermediate second flowmeter 42 and second valve 22 for measuring the ph of the treatment water flowing into mixing reservoir 12. A third pH meter or sensor 84 is installed in third conduit 18 intermediate third flowmeter 44 and third valve 24 to measure the pH of the treated water discharged from mixing reservoir 12.

First, second and third ph meters or sensors 80, 82 and 84 are operatively connected to control 32 by respective electrical conduits 86, 88 and 90.

Preferably, system 10 includes a fluid source 100 of acid and a fluid source 102 of base. As shown in the drawing, acid source 100 is connected to second conduit 16 upstream of second flowmeter 42 by a fluid conduit 104 and base source 102 is connected to second conduit 16 upstream of second flowmeter 42 by a fluid conduit 106.

Fourth and fifth, electrically actuated flow control valves 110 and 112 are installed in respective fluid conduits 104 and 106 to enable the flow regulation of acid and base into second conduit 16, and are operatively connected to control 32 by respective electrical conduits 114 and 116.

First and second one-way flow (check) valves 120 and 122 are installed in respective first and second fluid conduits 14 and 16 upstream of respective flowmeters 40 and 42. In particular, second check valve 122 is needed to prevent the contamination of the clean water by reclaimed water. First check valve 120 is useful to prevent the loss of treatment water into the source of reclaimed water.

OPERATION OF SYSTEM 10

From the drawing and the foregoing description, it can be seen that control 32 receives electrical inputs from first, second and third flowmeters 40, 42 and 44 (over respective electrical conduits 46, 48 and 50) indicative of the respective flow rates of the reclaimed water, the treatment water and the treated water. Control 32 also receives electrical inputs from first, second and third conductivity sensors 60, 62 and 64 (over respective electrical conduits 66, 68 and 70) indicative of the respective levels of TDS in the reclaimed water, the treatment water and the treated water. Further, control 32 receives electrical inputs from first, second and third pH meters or sensors 80, 82 and 84 (over respective electrical conduits 86, 88 and 90) indicative of the respective ph levels in the reclaimed water, the treatment water and the treated water.

Based on such flow rate, TDS and pH level inputs, control 32 controls first and second flow control valves 20 and 22 which controls the amounts of reclaimed water and treatment water flowing into mixing reservoir 12 in a manner causing the treated water discharged form the mixing reservoir to have the required quality. For example, if the reclaimed water flowing into mixing reservoir 12 has a TDS level much higher than required for the treated water discharged from the mixing reservoir, the flow of reclaimed water is throttled down by partially closing first valve 20 and the flow of treatment water from second conduit into mixing reservoir 12 is increased by opening second valve 22 until the required maximum TDS level of the treated water discharged from the mixing reservoir is achieved. If a particular flow rate of the treated water is required, first and second valves 20 and 22 are also operated to achieve that required treated water flow rate.

The required pH range of the treated water can, if needed, then be attained, without changing the settings of first and second valves 20 and 22 needed so that the treated water maximum allowable TDS is not exceeded, by the appropriate opening or closing of acid and base valves 104 and 106, provided that the addition of acid or base to the flow of treatment water through second conduit 16 is needed to enable attaining of the required treated water pH range.

Thus, by the appropriate operation of first, second, fourth and fifth valves 20, 22, 110 and 112, treated water meeting the pre-established quality can be obtained with a minimum use of the more costly treatment water, as is desirable from a cost standpoint, if not required by local water regulations. Although the operation of such valves to meet the required treated water quality can be done manually by an operator, it is within the scope of the present invention that the operation of such valves be computer controlled in response to the above-described electrical inputs into control 32 in a manner within the knowledge of one of average skill in the computer art.

CORRESPONDING METHOD

It is readily apparent from the foregoing description of system 10 that a corresponding method of treating reclaimed water to obtain treated water having a pre-established quality can be provided.

Briefly, such method comprises the steps of flowing reclaimed water and treatment water into a mixing reservoir through separate first and second fluid conduits and discharging treated water from the mixing reservoir through a third fluid conduit. The method includes the steps of installing flow control valves in at least the first and second conduits upstream of the mixing reservoir so that the flows of reclaimed and treatment water into the mixing reservoir can be separately controlled, and sensing such parameters as flow rate, TDS and pH in the reclaimed water flowing through the first conduit, in the treatment water flowing through the second conduit and in the treated water discharged from the mixing reservoir through the third conduit.

The method includes the steps of providing electrical signals indicative of the sensed parameters and controlling the opening and closing of the flow valves in the first and second conduits in a manner causing the discharging treated water to have the pre-established quality.

In the case of controlling pH of the treated water between pre-established limits, the method may include the steps of providing sources of acid and base, connecting these sources to the second, treatment water conduit and controlling operation of the acid and base valves in a manner necessary to provide the treated water having the requisite pH range.

The method may further include preventing the flow of reclaimed water into the treatment conduit by installing a check valve in the second conduit; preventing of the treatment water from flowing into the reclaimed water conduit is by the installing of a check valve in the first conduit.

Although there has been described and illustrated an automated system for treating a flow of reclaimed water with clean water in amounts providing a usable treated water, and a corresponding method for providing treated water, in accordance with the present invention for purposes of illustrating the manner in which the invention may be used to advantage, it is to be appreciated that the invention is not limited thereto. Therefore, any and all variations and modifications that may occur to those skilled in the applicable art are to be considered as being within the scope and spirit of the claims as appended hereto.

What is claimed is:

1. A water treatment system for providing a flow of treated water having a pre-established quality from a flow of reclaimed water having a quality poorer than said pre-established quality of said treated water and a flow of treatment water having a quality better than said pre-established quality of said treated water said water qualities based on parameters including relative conductivity or TDS values, said system comprising:

a. a mixing reservoir;

b. first and second fluid conduits connected to said mixing reservoir for respectively flowing said reclaimed water and said treatment water into said mixing reservoir;

c. a third fluid conduit connected to said mixing reservoir for discharging a flow of treated water from said mixing reservoir;

d. sensing means connected for sensing parameters including: (1) the flow rate and quality of the reclaimed water entering the mixing reservoir through said first fluid conduit, (2) the flow rate and quality of the treatment water entering the mixing reservoir through said second fluid conduit, and (3) the quality of the treated, water being discharged from said mixing reservoir through said third fluid conduit, said sensing means including separate water conductivity measuring means installed in said first and second fluid conduits upstream of said mixing reservoir and in said third fluid conduit downstream of said mixing reservoir;

e. electrical signal generating means being responsive to said separate conductivity measuring means for providing electrical signals indicative of the TDS levels in said reclaimed water, in said treatment water and in said treated water and indicative of said sensed water flow rates; and f. control means responsive to said provided electrical signals for regulating the flows of reclaimed water and treatment water into said mixing reservoir through said first and second fluid conduits so as to cause the quality of the treated water discharged from said mixing reservoir through said third fluid conduit to be at least about as good as said pre-established treated water quality, said pre-established treated water quality including a pre-established maximum TDS level.

2. The water treatment system as claimed in claim 1, wherein said control means include first and second electrically-controlled flow valves installed respectively in at respective ones of said first and second fluid conduits upstream of said mixing reservoir, said control means automatically controlling the opening and closing of said first and second valves to thereby regulate the flows of reclaimed water and treatment water into the mixing reservoir through said first and second fluid conduits so as to cause the treated water being discharged from the mixing reservoir through the third fluid conduit to be at least about as good as the pre-established quality of the treated water.

3. The water treatment system as claimed in claim 1, wherein said control means include first and second electrically controlled flow control valves installed respectively in said first and second fluid conduits upstream of said mixing reservoir and include means responsive to said electrical signals from said signal generating means for controlling operation of said valves so as to regulate the flows of reclaimed water and treatment water into the mixing reservoir in a manner causing the TDS level of the treated water discharged from the mixing reservoir through the third fluid conduit to be no greater than said pre-established TDS level.

4. The water treatment system as claimed in claim 1, wherein said pre-established treated water quality includes a pre-established pH range and wherein said sensing means also include first, second and third pH measuring means installed respectively in said first and second fluid conduits upstream of said mixing reservoir and in said third fluid conduit downstream of said mixing reservoir, said electrical signal generating means also being responsive to said pH measuring means for providing electrical signals to said control means indicative of the pH levels of the reclaimed water, of the treatment water and of the treated water.

5. The water treatment system as claimed in claim 4, including a source of acid and a source of base and including acid and base conduits connected for flowing acid from said acid source and base from said base source into said flow of treatment water, and wherein said control means include electrically controlled acid and base valves installed respectively in said acid conduit and said base conduit for controlling the flow of acid and base into said flow treatment water and thereby controlling the pH of said treatment water.

6. The water treatment system as claimed in claim 1, wherein said sensing means include first and second fluid flow meters installed respectively in said first and second fluid conduits upstream of said mixing reservoir for measuring the flow rates of the reclaimed and treatment water entering the mixing reservoir, and wherein said signal generating means provides electrical signals to said control means indicative of said flow rates of said reclaimed water and treatment water.

7. The water treatment system as claimed in claim 1, including one-way flow valves installed in the first and second fluid conduits so that the reclaimed water is prevented from flowing into the treatment water second conduit and so that the treatment water is prevented from flowing into the reclaimed water first conduit.

8. The water treatment system as claimed in claim 1, including means installed in said third conduit for enhancing mixing of the reclaimed and treatment waters in the mixing reservoir.

9. A method of providing a flow of treated water having a pre-established quality from a flow of reclaimed water having a quality poorer than said preestablished quality of said treated water and a flow of treatment water having a quality better than said pre-established quality of said treated water, said water qualities based on parameters including relative pH levels as well as relative conductivity or TDS values, said method comprising the steps of:

a. flowing said reclaimed water and said treatment water into a mixing reservoir through respective first and second fluid flow conduits;

b. discharging a flow of treated water from said mixing reservoir through a third fluid flow conduit;

c. sensing parameters including : (1) the quality of the reclaimed water entering the mixing reservoir through said first fluid conduit, (2) the quality of the treatment water entering the mixing reservoir through said second fluid conduit, and (3) the quality of the treated water being discharged from said mixing reservoir through said third fluid conduit, said sensing including sensing the pH levels as well as either the conductivity or TDS levels in each of said first, second and third conduits;

d. providing electrical signals indicative of said sensed reclaimed, treatment and treated water pH as well as conductivity or TDS levels; and e. regulating, in response to said electrical signals, the flows of reclaimed water and treatment water into said mixing reservoir through said first and second fluid conduits so as to cause the quality of the treated water discharged from said mixing reservoir through said third fluid conduit to be at least about as good as said pre-established treated water quality.

10. The method as claimed in claim 9, including the steps of installing respective first and second electrically-controlled flow valves in respective ones of the first and second fluid conduits upstream of the mixing reservoir, and automatically controlling the opening and closing of said first and second valves for regulating the respective flows of reclaimed water and treatment water into the mixing reservoir through said first and second fluid conduits in a manner causing the treated water being discharged from the mixing reservoir through the third fluid conduit to have at least the pre-established quality of said treated water.

11. The method as claimed in claim 10, wherein said pre-established treated water quality includes a pre-established maximum TDS level and wherein the TDS level in the flow of reclaimed water into the mixing reservoir is greater than said pre-established TDS level and the TDS level in the flow of treatment water into the mixing reservoir is less than said pre-established maximum TDS level, the method including the steps of measuring (1) the conductivity of the reclaimed water flowing into the mixing reservoir through the first fluid conduit, (2) the conductivity of the treatment water flowing into the mixing reservoir through the second fluid conduit, and (3) the conductivity of the treated water flowing from the mixing reservoir through the third fluid conduit, and providing electrical signals indicative of the TDS levels in said reclaimed water, in said treatment water and in said treated water.

12. The method as claimed in claim 11, including the steps of installing respective first and second electrically controlled flow control valves in respective ones of said first and second fluid conduits upstream of said mixing reservoir, and controlling operation of said valves so as to regulate the flows of reclaimed water and treatment water into the mixing reservoir in a manner causing the TDS level of the treated water discharged from the mixing reservoir through the third fluid conduit to be no greater than said pre-established maximum TDS level.

13. The method as claimed in claim 9, wherein said pre-established treated water quality includes a pre-established pH range and wherein the pH level of the reclaimed water flowing into the mixing reservoir is outside said pre-established pH range, said method including the steps of measuring (1) the pH level of the reclaimed water flowing into the mixing reservoir through the first conduit, (2) the pH level of the treatment water flowing into the mixing reservoir through the second conduit, and (3) the pH level of the treated water flowing out of the mixing reservoir through the third conduit, and providing electrical signals indicative of the pH of the reclaimed water, of the treatment water and of the treated water.

14. The method as claimed in claim 13, including the step of flowing an acid from an acid source or flowing a base from a base source into said flow of treatment water in a manner controlling the pH of said treatment water.

15. The method as claimed in claim 9, including the step of providing a back pressure in the flow of treated water from the mixing reservoir so as to enhance mixing of the reclaimed water and the treatment water in the mixing reservoir.

* * * * *